United States Patent
Lewis et al.

(10) Patent No.: US 11,628,907 B2
(45) Date of Patent: Apr. 18, 2023

(54) SPHERE BRAKE FOR CYCLES

(71) Applicants: Aaron J. Lewis, Waterford, PA (US); Joe Fiore, Bemus Point, NY (US)

(72) Inventors: Aaron J. Lewis, Waterford, PA (US); Joe Fiore, Bemus Point, NY (US)

( * ) Notice: Subject to any disclaimer, the term of this patent is extended or adjusted under 35 U.S.C. 154(b) by 150 days.

(21) Appl. No.: 17/127,143

(22) Filed: Dec. 18, 2020

(65) Prior Publication Data
US 2021/0188391 A1 Jun. 24, 2021

Related U.S. Application Data

(60) Provisional application No. 62/950,769, filed on Dec. 19, 2019.

(51) Int. Cl.
| | | |
|---|---|---|
| *B62L 1/00* | (2006.01) | |
| *F16D 55/02* | (2006.01) | |
| *F16D 65/092* | (2006.01) | |
| *F16D 65/18* | (2006.01) | |
| *B62L 3/02* | (2006.01) | |
| *F16D 121/20* | (2012.01) | |
| *F16D 121/04* | (2012.01) | |
| *F16D 121/14* | (2012.01) | |

(52) U.S. Cl.
CPC .............. *B62L 1/00* (2013.01); *B62L 1/005* (2013.01); *B62L 3/02* (2013.01); *B62L 3/023* (2013.01); *F16D 55/02* (2013.01); *F16D 65/092* (2013.01); *F16D 65/18* (2013.01); *F16D 2121/04* (2013.01); *F16D 2121/14* (2013.01); *F16D 2121/20* (2013.01)

(58) Field of Classification Search
CPC .. B62L 1/00; B62L 1/005; B62L 3/023; B62L 3/02; B62L 1/10; F16D 55/02; F16D 2121/04; F16D 65/18; F16D 65/092; F16D 2121/20; F16D 2121/14; B60B 27/0057
See application file for complete search history.

(56) References Cited

U.S. PATENT DOCUMENTS

| | | |
|---|---|---|
| 8,453,811 B2 | 6/2013 | Lewis |
| 2015/0014103 A1* | 1/2015 | Radhakrishnan ... F16D 65/0978 188/73.38 |
| 2016/0333953 A1 | 11/2016 | Lewis |
| 2020/0191217 A1* | 6/2020 | Lewis ................ B60B 27/0057 |
| 2020/0248765 A1 | 8/2020 | Lewis |

FOREIGN PATENT DOCUMENTS

| | | |
|---|---|---|
| WO | 2018/026349 A1 | 2/2018 |
| WO | 2019/028329 A1 | 2/2019 |

* cited by examiner

*Primary Examiner* — Pamela Rodriguez
(74) *Attorney, Agent, or Firm* — Thompson Hine LLP

(57) ABSTRACT

A cycle braking system is provided where the system comprises a brake sphere engaged with a shaft adjacent to a wheel of a cycle and a brake caliper, where the brake caliper is mounted to a cycle's chassis and aligned around the brake sphere rotor. In one embodiment, the cycle braking system further comprises brake pad(s) with an inner side and a contact side, a brake housing having the brake pad(s) positioned between the caliper and the contact side facing the brake sphere; and the brake caliper connected to a cycle's hydraulic lines.

16 Claims, 4 Drawing Sheets

SPHERE BRAKE FOR CYCLES

This application claims priority to U.S. Provisional Application 62/950,769 filed Dec. 19, 2019, which is incorporated herein in its entirety.

FIELD OF THE INVENTION

Provided is a braking system for a cycle, such as manually, powered and gravity driven single or multi-wheeled vehicles. More specifically, a sphere brake system is provided.

BACKGROUND

The two most common brake systems used in two wheeled applications are drum and disc brakes. The drum brake leverages an inner expansion design. When the brake is applied pads expand out from the axle towards the drum surface radially. Disc brakes use a simple c-clamp concept. When the brake is applied, pads "clamp" to opposing sides of the discs axially inward.

Existing cycle brakes (cycles include manually, powered and gravity driven single or multi-wheeled vehicles) consist of manual lever that is located on the cycle handlebar or foot pedal located in front of the foot peg. As the lever(s) is compressed, a cable is retracted, or hydraulic fluid is compressed to actuate a brake mechanism that compresses brake pads against a brake rotor. As a brake pad(s) compress, it applies friction to the rigid rotor affixed to the wheel thus slowing the rotation of the wheel bring the cycle to a stop.

However, with the above described braking systems, the brake system is exposed to the elements, foreign materials and objects that may compromise the brakes ability to compress properly which can hinder slowing or stopping. Since the distance and angular relationship to the wheel axis is not exact, braking pressure and adjustment may be inconsistent.

Therefore, an improved braking system is needed.

SUMMARY

In one aspect, a cycle braking system is provided where the system comprises a brake sphere engaged with a shaft adjacent to a wheel of a cycle and a brake caliper, where the brake caliper is mounted to a cycle's chassis and aligned around the brake sphere rotor. In one embodiment, the cycle braking system further comprises brake pad(s) with an inner side and a contact side, a brake housing having the brake pad(s) positioned between the caliper and the contact side facing the brake sphere; and the brake caliper connected to a cycle's hydraulic lines. In one embodiment, the cycle braking system comprises multiple braking systems which are located adjacent to one wheel on a single drive shaft of a cycle. In one embodiment, a splitter is used to evenly distribute fluid pressure to the braking systems located at one wheel on a single drive shaft of a cycle. In another embodiment, multiple braking systems are located adjacent to more than one wheel on a single drive shaft of a cycle. In one embodiment, a splitter is used to evenly distribute fluid pressure to braking systems located at more than one wheel on a single drive shaft of a cycle. In various embodiments, the brake is actuated with a mechanical system, an electrical magnet, or a solenoid. In one embodiment, the brake pad(s) are formed with an installation and removal slot. In one embodiment, the brake pad(s) comprise more than one piece connected mechanically to form one brake shoe assembly. In one embodiment, the cycle braking system further comprises a bleeder valve.

In another aspect, a cycle braking system is provided where the system comprises a brake sphere rotor profile permanently attached to a wheel hub, wheel, or drive shaft of a cycle and means for slowing the speed of the cycle by applying pressure to said brake sphere to slow the rotation of the same.

In yet another aspect, a method for slowing down a cycle utilizing a brake sphere braking system is provided, where the method comprises depressing a brake lever and/or foot pedal, increasing pressure in a system or signaling electronic frequency to activate a caliper, thereby forcing a brake pad to engage with a brake sphere, thereby causing friction between the brake sphere and brake pad; and resulting in slowing the rotation of the cycle's wheel. In one embodiment, the brake is installed on a shaft rotating around a central axle or axis.

DETAILED DESCRIPTION

The described sphere brake technology leverages axial compression in lieu of expansion. When the brake is applied, a hemispherical pad(s) compress on a spherical surface(s). This inherent design allows multi-directional brake force application around the brake surface generating more torque with a smaller brake effective diameter.

In one aspect, the sphere brake is centrally located by the axis of the cycle wheels. This is a constant location which insures consistent braking, brake adjustment, and replacement. In addition, the sphere brake provides increased surface area as compared to a flat surface. This increased surface area in turn increases friction and braking power. In one embodiment, the centrally located brake assembly and its components are designed in a compact manner allowing no tool brake pad changes. This design frees up space to improve function, aesthetics, and may reduce weight. In addition, the compact design provides increased protection from the elements, foreign materials, objects, and extremities of the riders. In various embodiments, the sphere brake assembly is actuated by hydraulics, electrics, pneumatically, or mechanical action.

Figure 1:
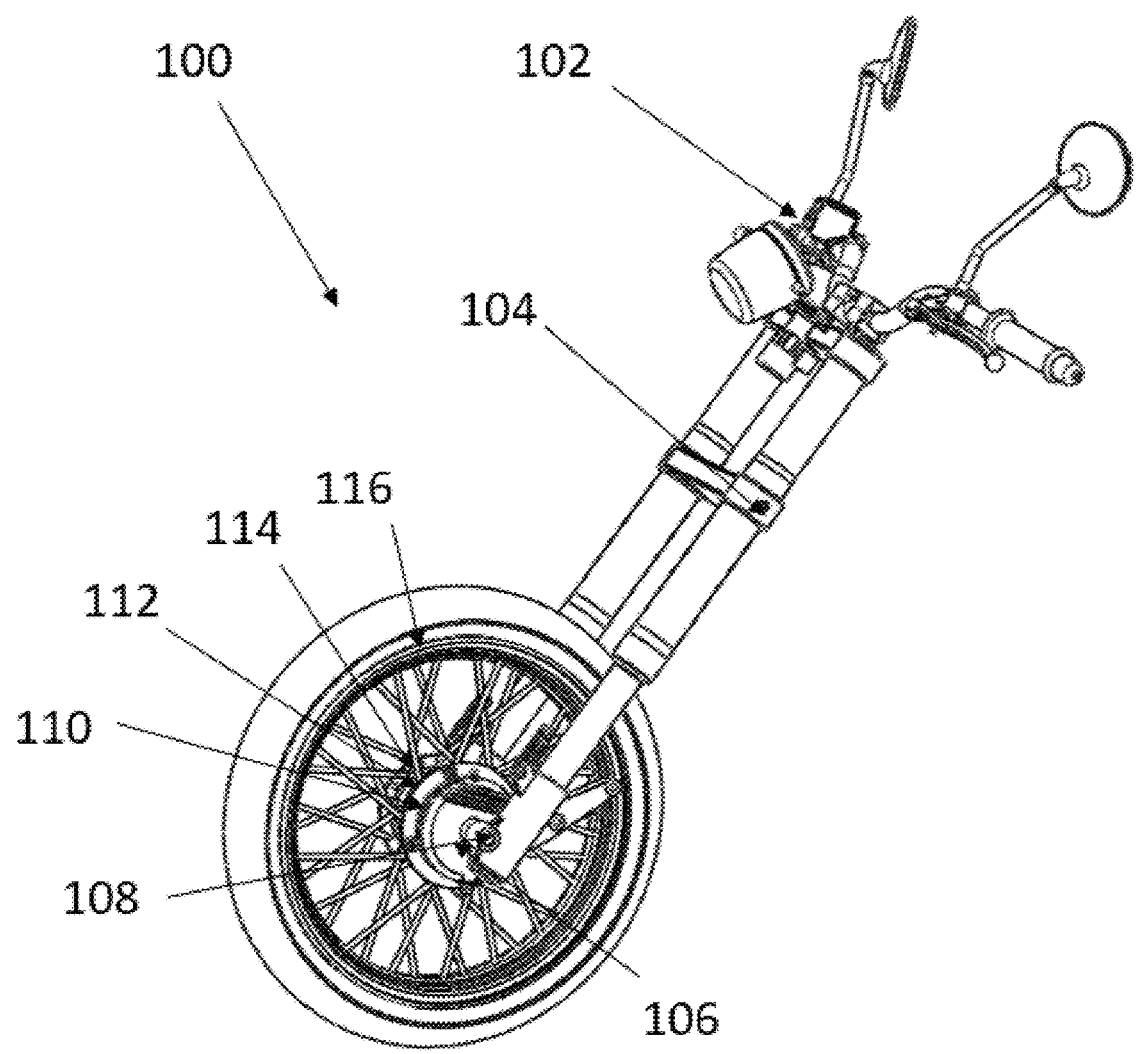
FIG. 1 shows the cycle braking system according to one embodiment.

Referring to FIG. 1, a diagram representing one embodiment of a hydraulic sphere brake system installed on a motorcycle (100) is provided. A hand lever (102) is compressed supplying pressure through a hydraulic line (104) down to a brake caliper (106). The brake caliper (106) is attached to the axle (108). As pressure increases in the caliper, a piston translates hydraulic pressure to mechanical pressure against a brake pad(s) (110). The brake pad (110) is positioned between the brake caliper (106) and sphere rotor (112) which is also attached to the wheel hub (114). The friction between the brake pad (110) and the sphere rotor (112) slow the rotation of the wheel (116).

Figure 2:
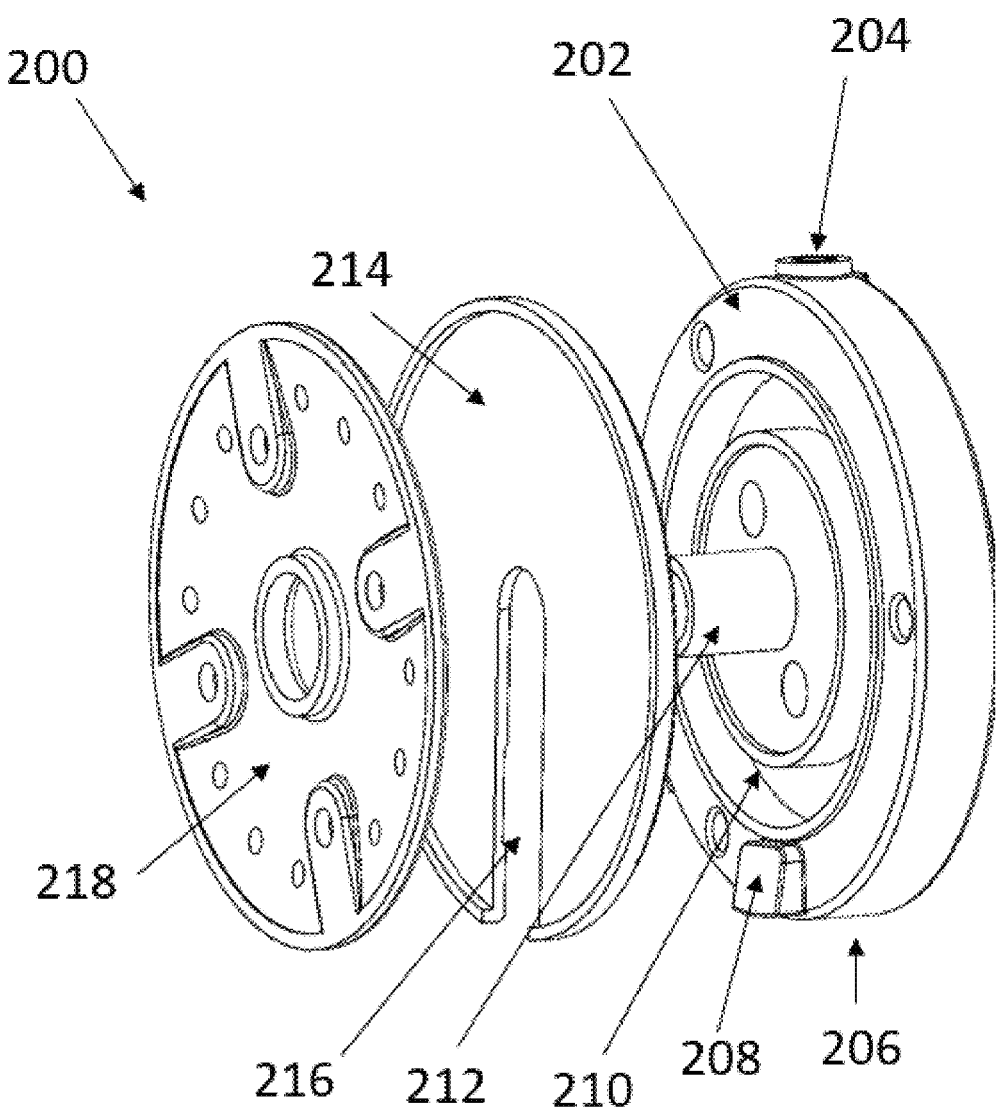
FIG. 2 shows an exploded view of the cycle braking system according to one embodiment.

Referring to FIG. 2, an explosion of one embodiment of a single hydraulic sphere brake (200) is provided. The brake caliper (202) comprises a bleeder valve (204), a hydraulic input line (206), and a brake pad guide (208). When hydraulic pressure is applied through the input line (206), the hydraulic pressure is converted into mechanical energy through the hydraulic piston (210). The hydraulic piston (210) applies mechanical pressure against the brake pad (214). The axle spacer (212) ensures proper tolerance between brake pad (214) and brake caliper (202). In one embodiment, the brake pad (214) has a slotted feature (216) which enables quick brake pad changes without any tools. The brake pad (214) translates friction against the sphere rotor (218). The sphere rotor (218) is attached to the wheel hub. The friction slows the rotation of the sphere rotor, slowing down the rotation of the wheel.

Figure 3:
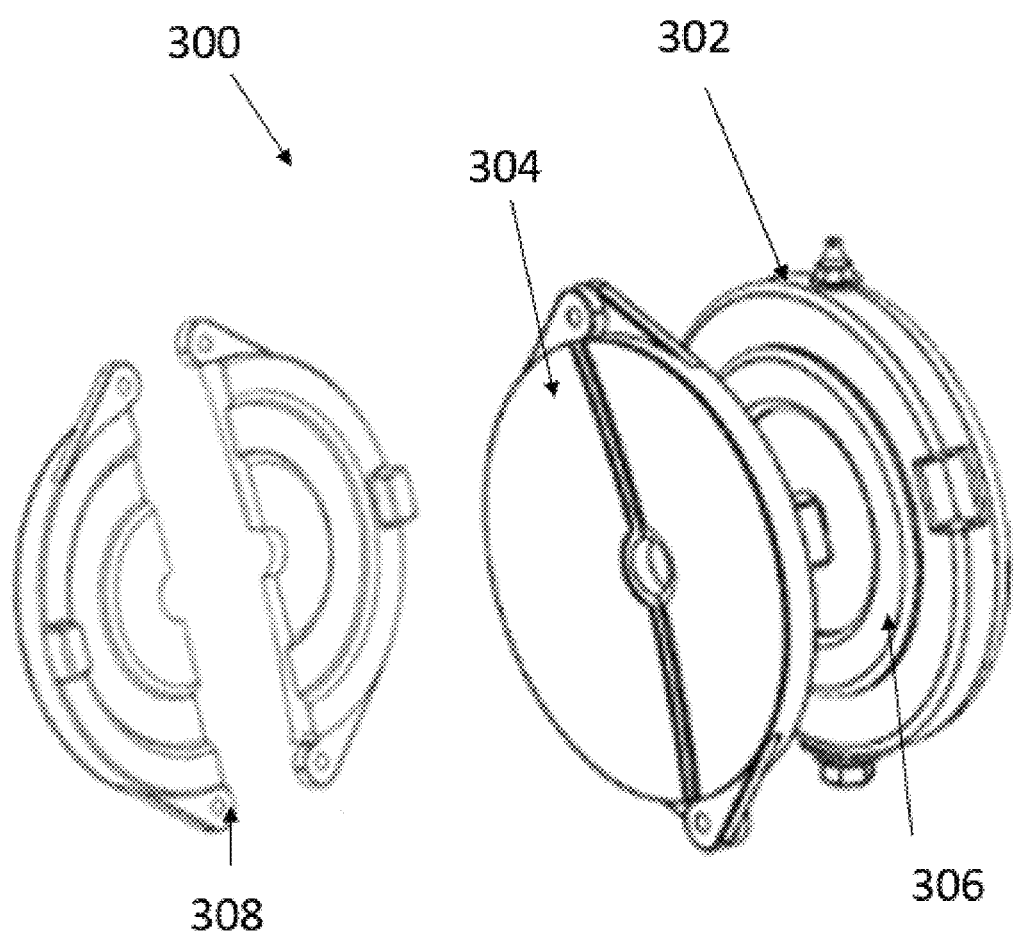
FIG. 3 shows the cycle braking system according to one embodiment.

Referring to FIG. 3, a diagram representing one embodiment of a hydraulic sphere brake (300) comprising a split brake pad (304) is provided. The hydraulic housing (302) converts hydraulic pressure to mechanical pressure through a piston (306). The piston (306) applies pressure against the multi-piece brake pad (304) which applies friction force to the sphere rotor to slow the rotation of the wheel. In one embodiment, the multi-piece brake pad (304) is mechanically held together with pins or clips (308) for quick installation and removal.

EXAMPLES

Example 1

Figure 4:
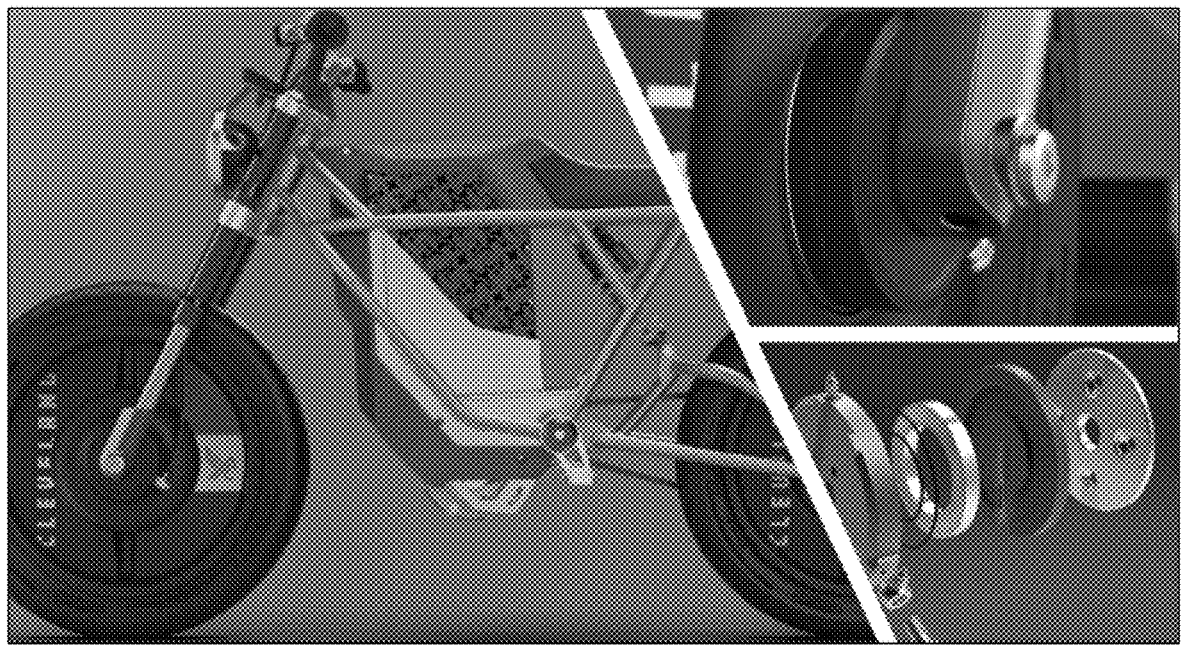
FIG. 4 shows a hydraulic sphere brake according to one embodiment installed on the LAND-DISTRICT e-motorcycle.

FIG. 4 shows the described hydraulic sphere brake installed on the LAND-DISTRICT e-motorcycle.

Example 2

Figure 5:
FIG. 5 shows a hydraulic sphere brake according to one embodiment installed on the Cleveland CycleWerks ACE motorcycle.

FIG. 5 shows the described hydraulic sphere brake installed on the Cleveland CycleWerks ACE motorcycle.

What is claimed is:

1. A cycle braking system comprising:
a brake sphere rotor positioned adjacent to a wheel of a cycle;
a brake pad positioned adjacent to the rotor and configured to selectively frictionally engage the brake rotor to cause braking of the cycle, wherein the brake pad includes a slot formed therein; and
a brake caliper positioned adjacent to the brake pad, wherein the brake caliper is configured to, when actuated, cause the brake pad to frictionally engage the brake sphere rotor, wherein the caliper includes a brake pad guide configured to be closely received in the slot to retain the brake pad in position.

2. The cycle braking system of claim 1 wherein the brake pad has an inner side and a contact side; wherein the system further includes a brake housing having the brake pad positioned between the brake caliper and the contact side facing the brake sphere rotor; and wherein the brake caliper is connected to the cycle's hydraulic lines.

3. The cycle braking system of claim 2 further comprising a bleeder valve operatively coupled to a hydraulic line, which is operatively coupled to the brake pad.

4. The cycle braking system of claim 1 wherein multiple braking systems are located adjacent to the wheel on a single drive shaft of the cycle.

5. The cycle braking system of claim 4, wherein a splitter evenly distributes fluid pressure to the braking systems located at the wheel on the single drive shaft of the cycle.

6. The cycle braking system of claim 1, wherein multiple braking systems are located adjacent to more than one wheel on a single drive shaft of the cycle.

7. The cycle braking system of claim 6, wherein a splitter evenly distributes fluid pressure to braking systems located at the more than one wheel on the single drive shaft of the cycle.

8. The cycle braking system of claim 1, whereby the brake caliper is actuated with a mechanical system, an electrical magnet, or a solenoid.

9. The cycle braking system of claim 1, wherein the brake pad comprises more than one piece connected mechanically to form one brake shoe assembly.

10. The cycle braking system of claim 1 wherein the slot is oriented generally radially.

11. The cycle braking system of claim 1 wherein the slot extends from a center of the brake pad to a radially outer surface.

12. The cycle braking system of claim 1 wherein the slot extends through an entire thickness of the brake pad.

13. The cycle braking system of claim 1 wherein the brake sphere rotor is rotationally coupled to the wheel.

14. A cycle braking system comprising:
a brake sphere rotor rotationally coupled to at least one of a wheel hub, wheel, or drive shaft of a cycle; and,
a brake pad configured to frictionally engage said brake sphere rotor to slow a rotation of the same, wherein the brake pad is configured to move in a direction parallel to an axis of rotation of the brake sphere rotor.

15. A method for slowing down a cycle utilizing a brake sphere braking system comprising:
depressing a brake lever and/or foot pedal;
increasing pressure in a system or signaling electronically to activate a caliper;
thereby causing a brake pad to move in a direction parallel to an axis of rotation of a wheel of the cycle, thereby forcing the brake pad to engage with a brake sphere;
thereby causing friction between the brake sphere and brake pad; and
resulting in slowing the rotation of the wheel.

16. The method of claim 15, wherein the brake sphere braking system is installed on a shaft rotating around a central axle or axis.

* * * * *